United States Patent

Daenzer-Alloncle et al.

[11] Patent Number: 6,139,896
[45] Date of Patent: Oct. 31, 2000

[54] REDUCED-FAT FLUID LACTIC CREAM WHICH AVOIDS PHASE SEPARATION DURING STORAGE

[75] Inventors: Martine Daenzer-Alloncle, Treycovagnes; Niklaus Meister, Grosshoechstetten; Madeleine Merz, Konolfingen, all of Switzerland

[73] Assignee: Nestec S.A., Vevey, Switzerland

[21] Appl. No.: 09/093,598

[22] Filed: Jun. 9, 1998

[30] Foreign Application Priority Data

Jun. 10, 1997 [EP] European Pat. Off. ............... 97201751

[51] Int. Cl.⁷ ................................................... A23C 13/00
[52] U.S. Cl. ........................ 426/586; 426/573; 426/578; 426/580; 426/585
[58] Field of Search ................................. 426/573, 578, 426/580, 585, 586, 583, 587

[56] References Cited

U.S. PATENT DOCUMENTS

| | | | |
|---|---|---|---|
| 4,473,594 | 9/1984 | Miller et al. | 426/578 |
| 4,647,465 | 3/1987 | van de Ven et al. | 426/570 |
| 4,770,892 | 9/1988 | Grealy et al. | 426/570 |
| 5,478,587 | 12/1995 | Mingione | 426/565 |
| 5,609,904 | 3/1997 | Koh et al. | 426/565 |
| 5,614,243 | 3/1997 | Dunn et al. | 426/578 |
| 5,711,986 | 1/1998 | Chiu et al. | 426/658 |
| 5,837,308 | 11/1998 | Campbell et al. | 426/604 |

FOREIGN PATENT DOCUMENTS

| | | | |
|---|---|---|---|
| 0167994 | 1/1986 | European Pat. Off. | 426/586 |
| 0558113 | 9/1993 | European Pat. Off. | |

*Primary Examiner*—Leslie Wong
*Attorney, Agent, or Firm*—Vogt & O'Donnell, LLP

[57] ABSTRACT

A fluid lactic cream which has a fat content in an amount, by weight, between 10% and 30% and which has been treated by an ultra-high temperature ("UHT") treatment or other sterilization procedure or by pasteurization to provide a cream product for unrefrigerated or refrigerated storage and which contains an additive component for controlling viscosity which is in an amount so that the composition has a viscosity between 250 and 1600 mPas and which is chosen from a group of (i) a modified starch in an amount, by weight, between 1.5 and 4%, or (ii) a mixture of modified starch and maltodextrin wherein, by weight, the modified starch is in an amount between 1.5 and 4% and the maltodextrin is in an amount between 1 and 4%, or (iii) a mixture of maltodextrin and xanthan wherein, by weight, the maltodextrin is in an amount between 1.5 and 4% and the xanthan is in an amount between 0.1 and 0.4%.

18 Claims, No Drawings

REDUCED-FAT FLUID LACTIC CREAM WHICH AVOIDS PHASE SEPARATION DURING STORAGE

BACKGROUND OF THE INVENTION

The present invention relates to cream products for consumption with foods and particularly to to fluid creams which are pasteurized or sterilized for storage and to creams which also include a milk composition component and more particularly, to fluid creams which have a reduced fat content as compared with lactic cream.

A patent already exists which mentions an emulsion which is capable of being whipped with a relatively reduced fat content. This patent U.S. Pat. No. 4,770,892 mentions a cream, but it contains, in addition, an alginate, cellulose derivatives and emulsifiers and because of the presence of these additives, it is fluid.

SUMMARY OF THE INVENTION

The aim of the present invention is to provide a fluid lactic cream which is obtained with milk components and which has good viscosity in spite of a reduced fat content. Moreover, it is necessary that no phase separation takes place during storage.

To that end, the present invention provides a fluid lactic cream which has been treated by an ultra-high temperature ("UHT") treatment or other sterilization procedure or by pasteurization to provide a cream product for unrefrigerated or refrigerated storage and which comprises a milk composition base component and has a fat content in an amount, by weight, between 10% and 30% and comprises an additive component for viscosity control which is in an amount so that the composition has a viscosity between 250 and 1600 mPas and which is chosen from a group of (i) a modified starch in an amount, by weight, between 1.5 and 4%, or (ii) a mixture of modified starch and maltodextrin wherein, by weight, the modified starch is in an amount between 1.5 and 4% and the maltodextrin is in an amount between 1 and 4%, or (iii) a mixture of maltodextrin and xanthan wherein, by weight, the maltodextrin is in an amount between 1.5 and 4% and the xanthan is in an amount between 0.1 and 0.4%.

DETAILED DESCRIPTION OF THE INVENTION

Herein, "lactic cream" means a cream prepared from a milk base and/or a skimmed milk base with addition of lactic fat, non-lactic fat or a mixture of lactic fat and non-lactic fat.

The cream according to the invention is not intended to be whipped, but this possibility can always be envisaged.

The viscosity of the lactic cream of the invention, as identified above, is measured with a Haake RS 100 rotational viscometer of the cone/plane type and working at a shear speed of 100 s$^{-1}$ and at 20° C.

The lactic fat used is cream with a fat content, which is normally between 30 and 40%. The non-lactic fat is a fat or a vegetable oil. This fat is not critical and may be either a coprah fat or sunflower oil, and the amount of fat in the cream according to the invention is preferably, by weight, between 15 and 25%.

To obtain the desired viscosity, modified starch is added to the cream. It is preferably added in an amount of from 3 to 4%. If the fat content of the lactic cream is lower, more starch should be added and vice versa. In a second embodiment, a mixture of starch and maltodextrins is added to the cream. The maltodextrins used are not critical. In a third embodiment, the lactic cream according to the invention contains a mixture of xanthan and maltodextrins, and in this case, the xanthan to maltodextrin ratio is between 1:4 and 1:8.

Several types of recipes can be envisaged for the lactic cream according to the invention. This cream is either flavoured savoury, or flavoured sweet, or salted, or sweet. It is also possible to envisage using this cream as snack topping, in whipped form or otherwise.

In the case of a flavoured savoury cream, it is possible to envisage flavouring with in particular mushrooms, cheese, fine herbs, garlic. In the case of a flavoured sweet cream, flavouring is carried out in particular with vanilla, banana, strawberries, chocolate, caramel and coconut.

The flavoured savoury cream is used in cooked, fresh, refrigerated or deep-frozen dishes. The flavoured sweet cream can be used as topping on fruit or ice creams or as dessert cream. The salted and sweetened neutral cream can be used in various applications in restaurants and catering services.

For the preparation of the cream according to the invention, the operation involves either a UHT treatment and an aseptic filling, or the mixture is prepared, filled into cans and sterilized, or the mixture is prepared, sterilized and filled, or the mixture is prepared, pasteurized and filled.

In the case of the UHT manufacture, milk powder, optionally with low-fat milk, is mixed with water, the additives for the milk powder are added thereto, and sugar, colourings and flavourings are dissolved therein. The cream (having a fat content of the order of 36%) is finally mixed and a UHT treatment is carried out at 148° C. for 10 sec, and homogenization is optionally performed at a pressure of less than 250 bar and then conveyed to the aseptic filling device.

In the case of the more conventional manufacture using sterilization, the mixtures are prepared in the same order as above and are filled into metal cans and treated in a sterilizer for 30 min.

The cream obtained according to the invention can be preserved at room temperature for 6 to 12 months. During this period of storage, there is no separation of fat and no formation of whey. In the case of a pasteurized cream or of a cream which is not aseptically filled after sterilization, they can be preserved for 6 weeks in a refrigerator.

EXAMPLES

The remainder of the description is made with reference to the examples.

Example 1

Flavoured Sweet Cream 51.10 kg of water are mixed with 11.25 kg of milk powder and 22 kg of low-fat milk. Vitamin B2, 0.27 kg of vanilla, 12.6 kg of sugar and 7.7 kg of modified starch (stabilized and cross-linked) are then added. The mixture is finally mixed with 75 kg of cream having a fat content of 36%. The UHT treatment is then carried out as mentioned above.

A product having the following composition is obtained: 15% milk fat, 9% milk solids-not-fat (SNF) (lactose, proteins), 7% sugar, 3.8% starch, 0.15% vanilla, the remainder being water.

The recipe can then be varied with other flavourings, such as strawberry flavouring or caramel. A product is obtained which has a viscosity of 983 mPas at the time of the preparation.

Example 2
Flavoured Savoury Cream

The mixture is prepared as above with water, milk powder and low-fat milk and, in addition, 1.3 kg of salt, 4.7 kg of maltodextrin, 0.63 kg of xanthan and the quantity of flavouring to arrive at the following composition of cream according to the invention: 25% milk fat, 7% SNF, 0.8% salt, 2.5% maltodextrins, 0.35% xanthan, between 0.1 and 1% flavourings (depending on the type of flavouring used), the remainder being water.

A final product having a viscosity between 250 and 300 mPas is obtained.

Example 3
Flavoured Savoury Cream

The mixture is prepared as for Example 1 with water, milk powder, low-fat milk, 1.5 kg of salt, 5 kg of maltodextrin, 8 kg of starch and the quantity of flavouring to obtain a final product having the following composition: 20% of milk fat, 8.5% of SNF, 0.8% of salt, 5.8% of maltodextrin/starch mixture, between 0.1 and 1% of flavourings, the remainder being water.

In the case of all these examples, a cream is obtained which can be preserved for 12 months at room temperature and which has a viscosity of the order of 1000 mPas.

Example 4
Neutral Cream 32.47 kg of water are mixed with 0.22 kg of milk powder. 3.4 kg of starch and finally 63.9 kg of cream having a fat content of 36% are then added thereto. A product is obtained which has the following composition: 23% milk fat, 3.9% SNF and 3% starch.

In another version, a mixture of 25.3 kg of water and 2.81 kg of milk powder is used. 0.33 kg of xanthan and 2.1 kg of maltodextrin and finally 69.45 kg of cream having a fat content of 36% are then added thereto. A product is obtained which has the following composition: 25% milk fat, 6.7% SNF, 0.3% xanthan and 2% maltodextrin.

In both cases, a cream is obtained which has a viscosity of the order of 300 mPas.

We claim:

1. A fluid lactic cream composition wherein the cream composition is pasteurized or sterilized and comprises a fat component in an amount, by weight based upon the lactic cream composition weight, of between 10% and 30%, non-fat milk solids which are solids of a milk composition component and which are, by weight based upon the lactic cream composition weight, in an amount of from 6.7% to 9%, a water component and a viscosity control component wherein the viscosity control component is in an amount by weight based upon the lactic cream composition weight and selected from the group consisting of (i) between 1.5% and 4% of a modified starch, (ii) a mixture of between 1.5% and 4% of a modified starch and of between 1% and 4% maltodextrin and (iii) a mixture of between 1.5% and 4% maltodextrin and of between 0.1 and 0.4% xanthan so that the lactic cream composition has a viscosity between 250 mPas and 1600 mPas.

2. A lactic cream composition according to claim 1 wherein the non-fat milk solids consist of milk solids provided by the milk composition component.

3. A lactic cream composition according to claim 1 wherein the fat is in an amount between 15% and 25%.

4. A lactic cream composition according to claim 1 wherein the viscosity control component consists of the modified starch.

5. A lactic cream composition according to claim 1 wherein the viscosity control component consists of the modified starch and maltodextrin mixture.

6. A lactic cream composition according to claim 1 wherein the viscosity control component consists of the maltodextrin and xanthan mixture.

7. A lactic cream composition according to claim 1 wherein the modified starch is present in the lactic cream composition and is in an amount of from 3% to 4%.

8. A lactic cream composition according to claim 1 wherein the fat comprises a lactic fat.

9. A lactic cream composition according to claim 8 wherein the lactic fat is cream.

10. A lactic cream composition according to claim 1 wherein the fat comprises a non-lactic fat.

11. A lactic cream composition according to claim 10 wherein the non-lactic fat is a vegetable fat.

12. A lactic cream composition according to claim 11 wherein the vegetable fat is selected from the group consisting of coprah fat and sunflower oil.

13. A lactic cream composition according to claim 1 further comprising an agent component selected from the group consisting of a flavorant agent, a sweetening agent and salt.

14. A lactic cream composition according to claim 1 wherein, for controlling viscosity of the composition, the composition consists of the viscosity-control components (i), (ii) and (iii).

15. A fluid lactic cream composition wherein the cream composition is pasteurized or sterilized and has a viscosity between 250 mPas and 1600 mPas and wherein, with exception to the presence of sugar and substances for flavoring and coloring, the components which constitute the lactic cream composition consist essentially of a fat component in an amount, by weight based upon the lactic cream composition weight, of between 10% and 30%, of non-fat milk solids which are solids of a milk composition component, of a water component and of a viscosity control component wherein the viscosity control component is in an amount by weight based upon the lactic cream composition weight and selected from the group consisting of (i) between 1.5% and 4% of a modified starch, (ii) a mixture of between 1.5% and 4% of a modified starch and of between 1% and 4% maltodextrin and (iii) a mixture of between 1.5% and 4% maltodextrin and of between 0.1 and 0.4% xanthan so that the lactic cream composition has the viscosity between 250 mPas and 1600 mPas.

16. A lactic cream composition according to claim 15 wherein the viscosity control component consists of the modified starch.

17. A lactic cream composition according to claim 15 wherein the viscosity control component consists of the modified starch and maltodextrin mixture.

18. A lactic cream composition according to claim 15 wherein the viscosity control component consists of the maltodextrin and xanthan mixture.

* * * * *